United States Patent

[11] 3,633,127

| [72] | Inventors | Robert F. Caristi<br>Everett;<br>Donald A. Leonard, Stoneham, both of Mass. |
|------|-----------|---|
| [21] | Appl. No. | 877,089 |
| [22] | Filed | Nov. 17, 1969 |
| [45] | Patented | Jan. 4, 1972 |
| [73] | Assignee | Avco Corporation<br>Cincinnati, Ohio |

[54] PULSED LASER DEVICE WITH IMPROVED DISCHARGE CIRCUIT
10 Claims, 3 Drawing Figs.

[52] U.S. Cl. ..................................................... 331/94.5, 315/241
[51] Int. Cl. .................................................... H01s 3/09
[50] Field of Search .......................................... 331/94.5; 315/235, 240, 241 S; 328/66, 67

[56] References Cited
UNITED STATES PATENTS

| 2,933,647 | 4/1960 | Germeshausen et al. | 315/241 S |
| 3,341,708 | 9/1967 | Bilderback | 331/94.5 |
| 3,351,870 | 11/1967 | Goldsmith et al. | 331/94.5 |
| 3,430,159 | 2/1969 | Roeber | 331/94.5 |
| 3,515,938 | 6/1970 | Morse | 331/94.5 |

FOREIGN PATENTS

| 1,155,613 | 5/1958 | France | 315/241 S |

*Primary Examiner*—William L. Sikes
*Attorneys*—Charles M. Hogan and Melvin E. Frederick ABSTRACT: An improved discharge circuit for an electrically pumped, pulsed gas laser wherein a high-voltage driving electrical field is periodically applied in a crossfield geometry across a cavity. In the preferred embodiment a capacitor discharge circuit, including switching means, an energy storage capacitor and at least one secondary capacitor are carried by the means defining the laser cavity, the secondary capacitor being connected across the cavity.

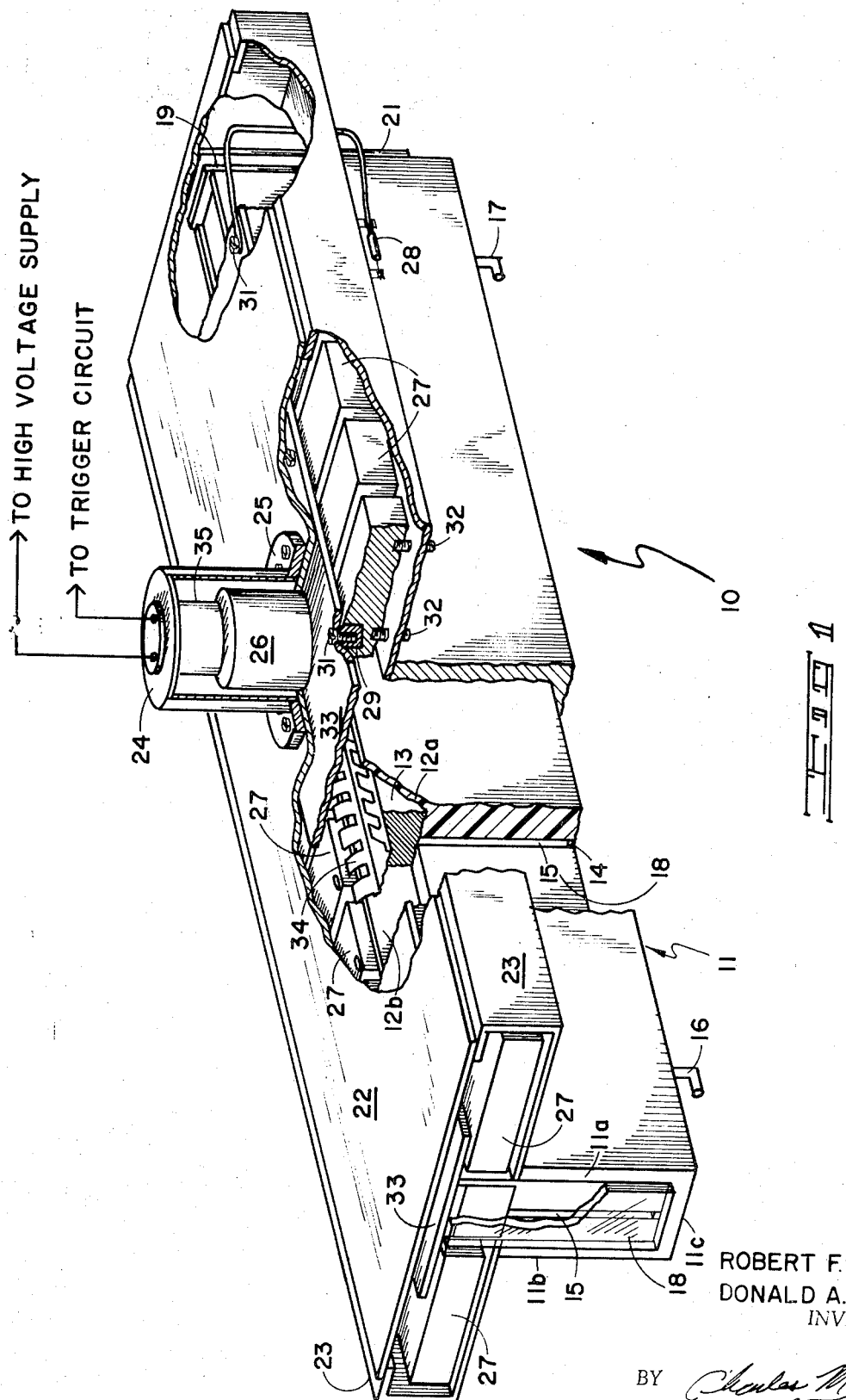

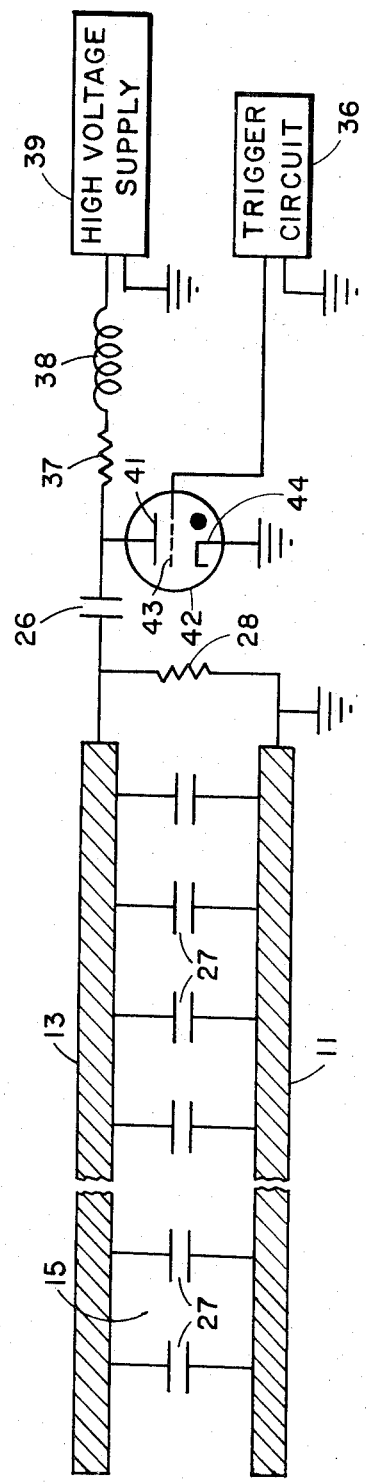
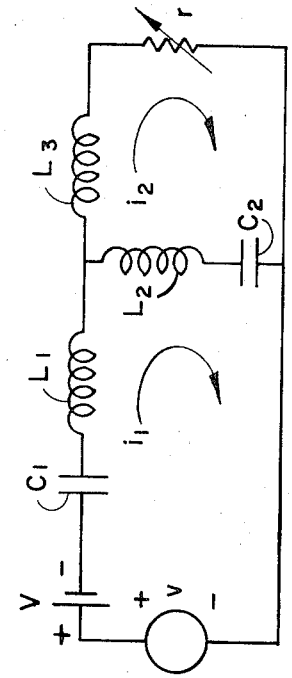

PULSED LASER DEVICE WITH IMPROVED DISCHARGE CIRCUIT

This invention relates to electrically pulsed gaseous laser devices, and more particularly to a discharge circuit for providing a pulsed electric field to actuate such laser devices.

In the operation of the prior are pulsed nitrogen and neon lasers, inductances in the discharge circuit have led to the limitation 'f discharge current, and failure of high-voltage cables forming a part of the discharge circuit has been a common occurrence. Further, in the aforementioned prior art lasers the discharge current was limited to a value materially less than that which would result if it were limited only by the discharge resistance of the laser cavity.

A crossfield geometry which has been developed for the pulsed nitrogen and neon lasers is described in U.S. Pat. application Ser. No. 536,094 filed Mar. 21, 1966 now Pat. No. 3,533,603, to which reference is made. (See, also, the article entitled, "The 5401A. Pulsed Neon Laser," by Donald A. Leonard published in IEEE Journal of Quantum Electronics, Vol. GE-3, No. 3, March 1967, pp. 134-135-). Improved electrode means for such a laser is described in U.S. Pat. application Ser. No. 743,867, filed July 10, 1968, and assigned to the same Assignee as this patent application, to which reference is also made.

In the aforementioned prior art crossfield type of laser, electrical power flows from a capacitor (charged by a conventional high-voltage source) through a plurality of low-inductance transmission cables to an upper electrode which extends the length of the active region or cavity. A U-shaped channel serves both as structural support for the device and as the other electrode. The discharge taken place between dielectric sidewalls. On the short time scale required by these lasers, the initial current distribution is essentially inductance controlled and when operating normally, and not subject, for example, to arc spot or hotspot failures, and particularly, failure of one or more of the parallel connected high-voltage transmission cables, extremely uniform discharges can be produced along the entire length of the channel.

However, because the current distribution is essentially inductance controlled, it is necessary that the high-voltage transmission cables have as low an inductance as possible. This contributes to cable failure and this problem is more pronounced at high pulse repetition rates. Clearly, as the pulse repetition rate is increased, the possibility of cable failure increases at least proportionately. The presence of high-voltage transmission cables also results in a high exposure to the high-voltage used (typically, 20 kv.) and a rather large amount of spurious high-voltage radiation since each of the cables also tends to function as an antenna.

It is a general object of the present invention to overcome the aforementioned objectionable features found in prior art gaseous lasers by providing a laser device which is both simple and inexpensive to manufacture and which has increased efficiency and dependability over known prior devices.

A further object of the invention is to provide a gas laser for producing light at high output power levels which employs an improved discharge circuit to provide a pulsed electric field in the gas discharge medium.

Yet another object of the invention is to provide a gas laser having a pulsed electric field wherein the pulse duration is greatly minimized and pulse current increased to increase the efficiency to the device.

A still further object of the invention is to provide efficient excitation for pulsed gas laser having very short upper state lifetimes.

A further object of the invention is to provide for pulsed gas lasers having very short upper state lifetimes, a discharge circuit that minimizes the current-limiting effects of both inductance and switch commutation time.

A still further object of the invention is to provide for pulsed gas lasers having very short upper state lifetimes a discharge circuit that provides an optimum combination of energy, voltage, and rise time for maximizing laser efficiency.

A still further object of the invention is to not only provide a more compact crossfield laser device, but one having a higher pulse repetition rate over prior art crossfield laser devices.

A still further object of the invention is to provide a crossfield laser device having a minimum exposure to high voltages and minimum spurious high-voltage radiation over that present in prior art crossfield laser devices.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

FIG. 1 is a perspective view of an embodiment of the invention taken partially in section and showing portions of the invention in detail;

FIG. 2 is a schematic diagram showing the electric circuit employed in the device of FIG. 1; and FIG. 3 is a schematic diagram of the circuit of FIG. 2 just after the thyratron begins to commutate.

Referring to the drawings, especially FIG. 1, there is shown a laser device generally designated by the numeral 10 which may be attached to and enclosed within a protective enclosure (not shown). The device 10 comprises a base 11 which may be attached to the aforementioned enclosure.

The base 11 is U-shaped member fabricated from any suitable conducting material, such as aluminum, having two side portions 11a and 11b and an interconnecting bight or bottom portion 11c. Within base 11, which also functions as an electrode, there is disposed a pair of sidewalls 12a and 12b fabricated of a suitable insulating material such as quartz or Pyrex glass. The outermost portions of sidewall members 12a and 12b have a relatively thin upwardly extending flange. An electrode member 13 formed of aluminum or the like is supported by the sidewalls and disposed between the aforementioned upwardly extending flanges of sidewall members 12a and 12b. In addition to being supported in an interfitting engagement between the sidewalls, the electrode member 13 serves to maintain the sidewalls in spaced relation and the flanges of members 12a and 12b prevent arcing between electrode member 13 and base 11. A plurality of spacers 14 or a stepped portion within the base 11 may be provided to maintain the lower portions of the sidewalls in spaced relationship. The space thus provided between the sidewalls defines a relatively thin elongated duct or cavity 15 extending from adjacent one end of the laser device 10 to the opposite end thereof.

A pair of gas feeder tubes 16 and 17 are provided in the bottom portion 11c of the base 11 and provide gas inlet and outlet passages through the bottom portion 11c to permit a gas to be flowed through the cavity 15.

A pair of transparent panels 18 and 10 are disposed adjacent each end of the sidewalls and serve to seal the ends of the cavity. The panels 18 and 19 are transparent to light at the wavelength of radiation produced in the cavity. The panels 18 and 19 may be fabricated from quartz or other well-known material having the desired properties as stated.

It should be noted here that the cavity 15 is generally maintained at a pressure other than atmospheric such as, for example, about 15-25 torr, during the operation of the laser device 10. As is obvious, therefore it is necessary to pressure seal the means defining the cavity 15. The various contacting surfaces between the sidewalls and the base 11, the electrode member 13, and the panels 18 and 19 are therefore sealed by a suitable cement or sealant material to provide at least a relatively gastight enclosure in the cavity 15.

Referring still to FIG. 1, adjacent the transparent panel 19 there is an adjustably disposed mirror 21. The mirror 21 may be a first surface aluminized mirror and may be adjustably supported in conventional manner to establish perpendicularity with the longitudinal axis of the cavity 15.

Cover means 22 and rectangular support members 23 extend the entire length of the base 11. A cylindrical member 24 is supported by member 22, said member 24 being attached to said member 22 by toroidal member 25. Members 22, 23, and 24 support and protect the components disposed therein and provide a return path for the discharge current more fully described hereinafter. The support member 23 is attached to and in electrical contact with the base 11 by means of screws so that it may be easily removed for repair purposes.

The electrode member 13 is electrically connected to an energy storage capacitor 26, a plurality of secondary capacitors 27, and a resistor 28 in the following manner. Disposed with the cover means 22 and the support member 23 are a plurality of secondary capacitors 27. The secondary capacitors 27 may be of the conventional type having an upper threaded terminal 29 adapted to receive a crews 31, and a pair of threaded studs 32, one of which (preferably the inner one) is the other terminal. The capacitors 27 are supported on and attached to the member 23 by the threaded studs 32. An electrically conductive plate 33 extending over and covering electrode 13 is supported by and electrically connected to the upper terminal 29 of capacitors 27 by screws 31. A length of spring finger stock 34 extending the length of electrode 13 provides electrical connection between plate 33 and electrode 13. The commercially available mica dielectric energy storage capacitor 26, preferably provided with a threaded terminal at one end (not shown) is typically supported and in electrical contact with plate 33 via the threaded terminal. Disposed above the storage capacitor 26 is switching means 35 such as, for example, a type 1801 hydrogen thyratron manufactured by Edgerton, Germeshausen & Grier, Inc. Storage capacitor and thyratron are disposed in cylindrical member 14; plate 33 being spaced from and electrically insulated from support members 23 and cover means 22. One terminal of the switching means 35 is connected to the nonthreaded terminal of storage capacitor 26, while the opposite terminal of the switching means is connected to the base of the cylindrical member 24.

The secondary capacitors may be arranged in oppositely disposed pairs along the length of the cavity parallel to each other, and in spaced relationship along the length of the channel as shown making, for example, 21 pairs of capacitors over a length of about 3 feet. Resistor 28 is connected in parallel with the secondary capacitors 27. The secondary capacitors must be of sufficient size to store enough energy to create an inversion in the gaseous lasing medium within the cavity 15 when the switching means or thyratron 35 is fired by a trigger circuit 36 (see FIG. 2) which controls the laser repetition rate. The storage capacitor 26 may be commercially available mica dielectric capacitor of sufficient size to store the high-voltage charge required to charge the secondary capacitors 27. The energy storage capacitor 26 is charged from a charging network circuit comprising resistor 37 and inductor 38. The charging network is coupled to a high-voltage supply 39 which provides, for example, 20 kilovolts. The charging network functions to allow the laser device to be operated at a low repetition rate of a single pulse or repetitively up to rates of 100 pulses per second or more. The value of resistor 37 and inductor 38 are chosen to be consistent with the fastest repetition rate at which the circuit is intended to operate. Resistor 37 and inductor 38 also acts as isolation elements between the high-voltage source 39 and the balance of the circuit. The resistor 37 used in the preferred embodiment was 250 kΩ and the inductor 38 was 100 henries.

In prior are devices of the type disclosed, for example, in the aforementioned U.S. Pat. application Ser. No. 536,094, now Pat. No. 3,553,603, high-voltage jacks mounted in a cover member are connected to a plurality of coaxial or high-voltage transmission cables. One end of these parallel connected cables are, via the aforementioned jacks, electrically coupled at equally spaced intervals to the upper electrode, their other ends being coupled through a triggered spark gap or thyratron to a storage capacitor, generally a capacitor bank. The energy for the capacitor bank is provided by a high-voltage DC source which is connected in series with a current-limiting resistor. The high-voltage transmission cables are grounded to the cover member and serve to complete the circuit through the cover member and the base member to the gaseous medium in the cavity.

Referring now to FIG. 2, taken in connection with FIG. 1, it will be seen that a plurality of secondary capacitors 27 substantially equally spaced one from another are coupled in parallel across cavity 15, they being connected in parallel to electrode 13 and base member 11 as shown in FIG. 2 as is resistor 28. The parallel connected secondary capacitors 27 are in turn connected through the energy storage capacitor 26 to the plate 41 of a thyratron 42. The control grid 43 of the thyratron 42 is coupled to a conventional trigger circuit 36 and the cathode 44 of the thyratron 42 is connected to ground as is base member 11. The plate 41 of the thyratron is coupled through a series connected charging network of resistor 37 and inductor 28 to the high-voltage supply 39. The high-voltage supply 39 and trigger circuit 36 are grounded thereby completing the high-voltage and trigger circuits.

The resistance of resistor 28 connected across cavity 15 is chosen to be large compared to the resistance of the gas during discharge and small compared to resistor 37. As previously noted, a suitable thyratron is, for example, a type 1802 hydrogen thyratron manufactured by Edgerton, Germeshausen & Grier, Inc. The energy storage capacitor 26 should, for example, have an inductance of about 5 nanohenries or less, a capacitance of about 12,000 picofarads at °kv. whereby its stored charge is sufficient to charge the secondary capacitors 27 connected across cavity 15 to the voltage necessary to break down the gas in cavity 15. Capacitors 27 should, of course, as indicated above, have a capacitance such that when the stored charge of storage capacitor 26 is discharged into them by actuation of thyratron 42, they will, in turn, uniformly break down and discharge into the gas in cavity 15. In a circuit as shown in FIG. 2, if the capacitance of capacitors 27 connected across cavity 15 is zero, the device will not operate satisfactorily, if at all. On the other hand, if these capacitors are sized too large, it is not possible to break down the gas in cavity 15 due to the inability to build up a sufficiently high voltage during each pulse. There is, however, an optimum ratio of the size of the secondary capacitors 27 to the size of the storage capacitor 26. This optimum ratio is about 0.8.

The circuit shown in FIG. 2 minimized the effects of current limitation present in the aforementioned prior art device. Shown in FIG. 3 is the equivalent circuit during commutation of the thyratron 42 of FIG. 2. In FIG. 3 a DC source of voltage V represents the charge on the storage capacitor 26 designated $C_1$; the time-varying voltage $v$ represents the anode drop of the thyratron 42; the inductance $L_1$ represents the equivalent series inductance of the thyratron 42 and storage capacitor $C_1$ inductance $L_2$ represents the equivalent series inductance of the secondary capacitors designated $C_2$; $L_3$ represents the equivalent series inductance of the laser assembly; and variable resistance $r$ represents the resistance of the gaseous medium in the cavity 15.

Just after the thyratron begins to commutate, the current $i_1=i_2=0$ and the voltage across the secondary capacitors is zero, and the resistance $r$ of the gas is essentially infinite. Further, just after the thyratron begins to commutate, the secondary capacitor $C_2$ begins to charge, the current $i_2$ remaining essentially zero since the resistance of the gaseous medium in cavity 15 is very high until the voltage across the secondary capacitor $c_2$ reaches a value sufficient to cause the gas to break down. Upon breakdown of the gaseous medium in cavity 15, the secondary capacitor $c_2$ discharges into the gaseous medium through the equivalent inductors $L_2$ and $L_3$. By proper selection of the secondary capacitor $C_2$ and by construction of the laser channel as shown and described hereinabove, the equivalent inductances $L_2$ and $L_3$ may be made materially less than the equivalent inductance $l_1$ of the thyratron and storage capacitor. If the circuit inductances are provided as described above, a peak laser current will be provided that is substantially greater than the peak current through the thyratron. Further, the peak laser current will also have a rise time substantially faster than that which the thyratron and the equivalent inductance $L_1$ would otherwise allow.

If only resistor 37 is provided, the circuit described hereinabove will function satisfactorily to provide only single pulse operation or pulsed operation at a low repetition rate. On the other hand, if only inductor 38 is provided, the circuit will function satisfactorily to provide only a repetitive pulse rate, and the required high voltage will be reduced by approximately one-half. A proper combination of resistance and inductance in accordance with the invention provides a series connected charging network permitting operation on a single pulse or high (100 p.p.s.) repetition rate and with a fixed voltage power supply. In accordance with the invention, the combination of resistors and inductors comprising the charging network in combination with the energy storage capacitor is selected to form a critically damped circuit. As herein used, critically damped means that the circuit parameters are selected such that the storage capacitor will charge to at least substantially the full supply voltage within the interpulse time without at least substantial overshoot or substantial damping.

The various features and advantages of the invention are thought to be clear from the foregoing description. Various other features and advantages not specifically enumerated will undoubtedly occur to those versed in the air, as likewise will many variations and modifications of the preferred embodiment illustrated, all of which may be achieved without departing from the spirit and scope of the invention as defined by the following claims

We claim:

1. In a discharge circuit for gas; and an electrically pumped laser device for producing light, comprising means defining an elongated cavity having a longitudinal axis; means for supplying to said cavity a gas having at least two energy levels above the ground energy level in which the net excitation rate for the higher of the two upper levels is greater than the net excitation rate for the lower of the two energy levels during electric discharge in said gas; and first and second oppositely disposed electrode means communicating with said cavity for applying an electric field across said cavity normal to and along said longitudinal axis to product an inversion between the two upper energy levels of said gas, the combination comprising:
   a. input means for connection to a high-voltage source;
   b. a storage capacitor which couples said first electrode means and said input means;
   c. secondary capacitor means coupled to said first and second electrode means; and
   d. means including switching means for sequentially charging said storage capacitor and then coupling the charge on said storage capacitor to said secondary capacitor means to effect an electric discharge through said gas.

2. The combination as defined in claim 1 wherein said storage capacitor means and secondary capacitor means are carried by the means defining said cavity.

3. The combination as defined in claim 1 wherein said secondary capacitor means comprises a plurality of capacitors connected to said electrode means at respectively different points along the length of said electrode means.

4. The combination as defined in claim 3 wherein the ratio of the capacitance of said secondary capacitor means to said storage capacitor is about 0.8.

5. The combination as defined in claim 2 additionally including resistor means coupled to said first and second electrode means and said input means includes a critically damped charging network of at least one series connected resistor and inductor.

6. The combination as defined in claim 5 wherein the value of said resistor means coupled to said electrode means is large compared to the resistance of said gas during discharge through it and small compared to the resistance of said charging network.

7. The combination as defined in claim 6 wherein said storage capacitor, switching means, and said secondary capacitor means are carried by the means defining said cavity and in close proximity thereto, said means defining said cavity at least in part forming part of the electrical circuit between said secondary capacitor means and said second electrode means.

8. In a discharge circuit for pumping an electrically pumped laser device for producing light, comprising means defining an elongated cavity having a longitudinal axis; means for supplying to said cavity a gas having at least two energy levels above the ground energy level in which the net excitation rate for the higher of the two upper levels is greater than the net excitation rate for the lower of the two energy levels during electric discharge in said gas; and first and second oppositely disposed electrode means communicating with said cavity for applying an electric field across said cavity normal to and along said longitudinal axis to produce an inversion between the two upper energy levels of said gas, the combination comprising:
   a. input means for connection to a high-voltage source having a voltage high enough to break down said gas in said cavity;
   b. a storage capacitor connected in series between said first electrode means and said input means;
   c. secondary capacitor means coupled to said first and second electrode means, said secondary capacitor means having a capacitance substantially less than that of said storage capacitor means; and
   d. means including switching means for charging said storage capacitor to a voltage sufficient to breakdown of said gas in said cavity means and then coupling the charge on said storage capacitor to said secondary capacitor means to effect an electric discharge through said gas from said secondary capacitor means.

9. The combination as defined in claim 8 and including resistor means coupled to said first and second electrode means, said second electrode means comprising an electrically conductive substantially U-shaped member having two leg portions and a bight portion interconnecting said leg portions, said bight portion defining one side of said cavity and being disposed normal to said electric field, said first electrode means defining a side of said cavity opposite to said bight portion, and a pair of electrically nonconductive members covering the inner surface of each said leg portion and extending between said first electrode means and said bight portion; electrically conductive support means carried by said second electrode means and in electrical contact therewith, said secondary capacitor means comprising a plurality of capacitors carried by said support means in close proximity to said first and second electrode means, said plurality of capacitors each being electrically connected to said first and second electrode means at respectively different points along the length thereof.

The combination as defined in claim 9 wherein said storage capacitor and said switching means are carried by said support means in close proximity to said secondary capacitor means.

* * * * *